June 2, 1964  A. M. ODOK  3,135,915
METHOD OF DETERMINING THE CONDITION OF ELECTRICAL INSULATION
INCLUDING THE PRESENCE OF POLAR MATERIALS THEREIN AND
THEREON USING D.C. VOLTAGE
Filed Sept. 8, 1959

INVENTOR
ADNAN M. ODOK

BY Vernon H. Kalb
ATTORNEY

United States Patent Office 3,135,915
Patented June 2, 1964

3,135,915
METHOD OF DETERMINING THE CONDITION OF ELECTRICAL INSULATION INCLUDING THE PRESENCE OF POLAR MATERIALS THEREIN AND THEREON USING D.C. VOLTAGE
Adnan M. Odok, Erie, Pa., assignor to General Electric Company, a corporation of New York
Filed Sept. 8, 1959, Ser. No. 838,625
4 Claims. (Cl. 324—54)

My invention relates to non-destructive testing of electrical insulation and more particularly to non-destructive testing whereby the dielectric strength and the condition of the insulation may be determined.

Generally stated, the purpose of an insulation system test is to determine whether the system will withstand, for a prescribed period of time, dielectric stresses imposed by its mode of utilization. The dielectric strength of insulation may be affected by one or more of several conditions such as mechanical damage, chemical deterioration, and the presence of dirt, dust or moisture.

The mechanism of insulation breakdown varies with the insulation condition; basically it can be either intrinsic, or due to discharges and thermal instability. Intrinsic breakdown, which is dependent upon the inherent properties of the insulation, may be best defined as the type of breakdown which occurs at very high voltages if the possibility of the other two kinds of breakdown is excluded. The intrinsic dielectric strength is a function of time, temperature and thickness and material of the insulation. Thermal breakdown may be due to heat generated in conducting paths and/or the dielectric losses that occur with change in alternating current (A.C.) stresses. Both of these losses will increase with increasing temperature; therefore, a thermal instability can occur in which the generated losses cannot be dissipated as rapidly as they are produced. Consequently, very high local temperatures can occur leading to deterioration of the insulation material. Insulating materials are usually not of a homogeneous structure, and may have many more or less conducting cross paths inside and on the surface, and voids of different sizes. This structure may be regarded as a random lattice network of capacitors and resistors. For a given potential across the insulation there is a certain potential and current distribution in the lattice. Should the potential difference between any two points exceed the ionization value for gas within the insulation voids, the gas will become conducting and shifting of charges in the insulation system will take place. With new distribution or especially during redistribution of some new gaps will be conducting. Therefore, random discharges will occur although the voltage across the insulation may be kept at a constant value.

Although ionization of a gas adjacent to or trapped in the insulation is a common feature of all types of discharges, it should be pointed out that the discharges may be internal, external or on the surface. Internal discharges result from breakdown of gases in voids inside the insulation. External discharges may result from the formation of an ionization path between the surface of the insulation and a conductor or ground. For example, a discharge between the slot wall and wall insulation in a machine is included in this type of discharge. Discharges impinging on the insulation surface cause localized hot spots which may lead to subsequent breakdown of the insulation when subjected to direct current (D.C.) stresses. Surface discharges may occur beween conducting spots on the insulation if a large part of the insulation surface is covered by conducting paths or substances along the surface between the conducting spots. After each discharge, a redistribution of potential on the surface takes place.

In view of the foregoing theories of insulation breakdown, it follows that the purpose of the test method should be to determine the highest voltage level at which any given insulation will be free of damaging ionization and partial breakdowns of weak conducting paths; moreover, in order to determine what is the cause of any discharge which might induce breakdown, the result should show whether discharges are attributable to moisture, dirt, or conducting paths on creepage surfaces.

Prior art techniques of D.C. high potential insulation testing usually consist of measuring the leakage current when the insulation is subjected to an applied voltage. In one such test, the dielectric strength is predicted from the leakage-current characteristic of the insulation. The steady state leakage current is measured as a function of voltage applied between electrodes. Still another method employs the leakage current as a function of time with the voltage held constant. This second method is usually referred to as the absorption or polarization-current characteristic. Generally the evaluation of insulation by direct voltage has been based on the information derived from the above-mentioned tests. However, in a few instances, test procedures also have been employed where ionization probes were used to detect electrical discharges at certain locations of electrical windings. Additionally, it has been proposed to detect the mere existence of electrical noise when an electrical discharge in the insulation occurs.

The leakage-current characteristic by itself does not yield information concerning the presence of polar materials (dirt and moisture), because rapid increase of current with applied voltage is a relative condition which is difficult to recognize unless the characteristic of the clean, dry insulation for the machine under investigation is available. In the absence of this information, the absorption-current characteristic must be used to determine the degree of moisture in the insulation.

The absorption-current characteristic is determined by applying a constant D.C. voltage across the insulation test sample for a predetermined length of time. When the voltage is initially applied, a rather high current is observed, and after a certain time, the current settles to a lower steady value called the leakage current. The behavior of the insulation under these conditions resemble that of a lattice network consisting of ohmic resistances and capacitances. A polarization index, defined as the ratio of insulation resistance obtained at the end of a ten-minute period to the insulation resistance obtained at the end of a one-minute period, is determined from this test. The polarization index will vary depending on the condition and moisture content of the insulation. No definite relation between dielectric strength and polarization index is determinable.

The D.C. potential testing methods described above are time consuming and do not yield positive information as to the condition of the insulation under test. Additionally, these D.C. test methods often result in surprise breakdowns, thereby rendering the insulation useless. Alternating current power factor tests are another means of testing insulation. The power factor of the insulation under test is obtained by measurements made with a voltmeter, ammeter and wattmeter, or a special bridge arrangement. The power factor measured is then related to the dielectric strength of the test insulation. These A.C. high potential tests are complicated and require bulky equipment because of the large reactive power needed to charge the interfacial capacitances of the insulation in a machine insulation system. In addition to these limitations, the tests are mostly of the go or no-go type and are based on fixed over-stress determined mainly by experience.

To overcome the deficiencies and limitations of methods of testing electrical insulation of the prior art, I provide a method whereby the dielectric strength of insulation and the physical condition thereof may be determined rapidly and with a minimum of equipment. Furthermore, the method I provide is especially adaptable for field testing of electrical insulation.

Accordingly, it is an object of my invention to provide a method for non-destructive testing of electrical insulation which gives definite information as to the condition of the insulation.

It is another object of my invention to provide a method of predicting the dielectric strength of insulation, together with determining the condition of the insulation.

It is a further object of my invention to provide a method for determining the dielectric strength of electrical insulation.

It is a still further object of my invention to provide a method for predicting the dielectric strength and determining the condition of electrical insulation which is particularly adaptable for field testing.

Briefly stated, my invention is based on the discovery that in testing insulation systems of electrical machines with direct voltage, breakdown of the insulation is always preceded by strongly intensified electrical noise. More particularly, I have found that the frequency spectrum and the character of this noise, that is, the pattern of the randomly varying alternating component of the leakage current is dependent on insulation condition. Observations have shown that the pre-breakdown noise is not always connected to ionization of the gas surrounding the insulation or trapped in it, but very often is due to shift of charges by partial breakdowns of spots of low strength such as conducting paths. In view of the fact that electrical noise, whose character and frequency is dependent on the insulation condition, occurs prior to breakdown of the insulation when stressed with a D.C. potential, my method of testing provides for detection and interpretation of the electrical noise, more specifically, the detection of the pattern of the randomly varying alternating component of the leakage current, together with measurement of an applied potential to enable determination of the dielectric strength and the condition of the insulation. My method thereby eliminates a major deficiency and limitation of D.C. insulation testing, i.e., the possibility of surprise insulation breakdowns which render the insulation useless.

The features of the invention which are believed to be novel are set forth with particularity in the appended claims. The invention itself, however, both as to its organization and method of operation, together with further objects and advantages thereof, may best be understood by reference to the following description when taken in connection with the drawings in which:

Figure 1:
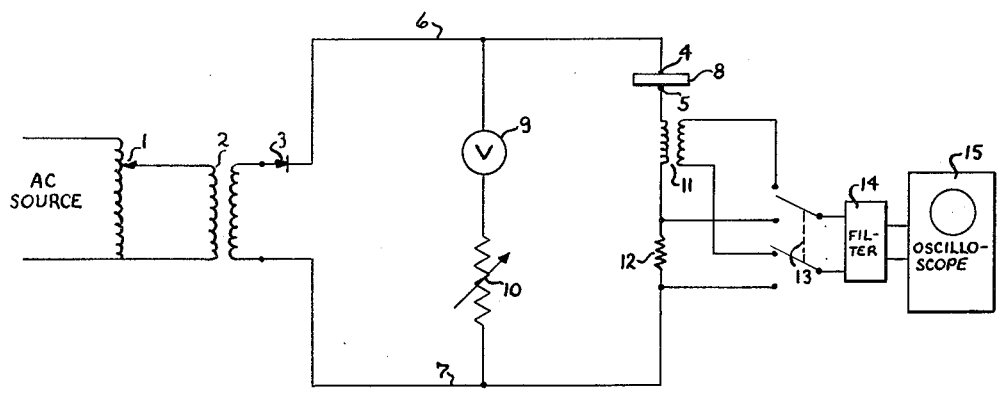
FIG. 1 illustrates a test circuit which may be used in practicing my invention.

Referring now to FIG. 1, I show a test circuit which may be utilized in making insulation tests in accordance with my invention. A D.C. voltage may be derived from an A.C. source by means of an autotransformer 1, transformer 2 and rectifier 3. The A.C. voltage applied to the primary of the transformer may be varied by movement of the tap on the autotransformer 1. The D.C. voltage is applied to a test sample or insulation system across the terminals 4 and 5 over lines 6 and 7. The test sample or insulation system 8 may be the insulation of an electric machine coil. In many such instances the terminals 4 and 5 may be connected to a conductor and machine frame, the test sample being the insulation about the conductor. A voltmeter 9 is connected across the terminals 4 and 5 to measure the potential applied to the insulation.

A multiplier resistance 10 is placed in series with the voltmeter 9 to limit the current therethrough and to adjust the voltage range measured. Connected in series with the test sample are the primary of an isolation transformer 11 and a current-measuring device shown as a resistor 12.

Figure 2:
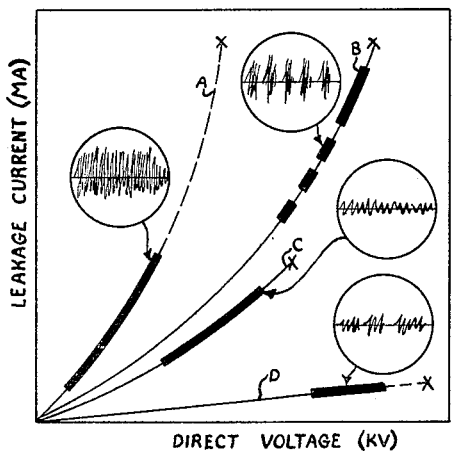
FIG. 2 is illustrative of various discharge patterns which may occur, dependent on the condition of the insulation, as related to typical leakage-current characteristics.

A voltage proportional to the current in the circuit is picked up either through the transformer 11, or across the terminals of the current-measuring resistor 12. As illustrated in FIG. 2, the current in the circuit is the leakage current associated with the insulation being tested. The double pole, double throw switch 13 is provided to select the source from which the test voltage will be picked up. It is to be realized, of course, that in practicing my invention, only one of the voltage pick-offs illustrated would be used. The voltage proportional to the current in the test circuit is applied to a filter 14 of any suitable type having a lower cut-off of approximately 1,000 cycles per second to eliminate D.C. and low frequency components of the leakage current and allow the higher frequency components thereof to pass. The output of the filter is applied to a suitable detector which, for purposes of illustration, is shown as an oscilloscope 15.

When an insulation system or sample is to be tested, the sample is placed between the terminals 4 and 5. If, for example, it is desired to test the insulation of a field coil on a D.C. machine, the terminals 4 and 5 may be connected to the coil and to the frame of the machine. Then, an increasing D.C. voltage is applied across the terminals 4 and 5. This voltage is preferably applied in incrementally increasing steps by varying the tap on autotransformer 1. A voltage proportional to the discharge current is applied to the oscilloscope through the filter 14 from a voltage pick-off of one of the types described. As the voltage is increased, the oscilloscope is observed to determine if a discharge or a charge shift is occurring in the insulation, and if so, the character of the discharge. Before the applied voltage reaches the breakdown value of the insulation, discharges or current fluctuations due to charge shifts, occur in the insulation. Continuous and intense discharges indicate that the breakdown voltage of the insulation system is being approached; also, the noise pattern of the discharges varies with the dielectric condition and/or degree of contamination (polar materials) of the insulation.

For purposes of illustration and explanation, I show in FIG. 2 the leakage current characteristics for a sample of insulation for various conditions of insulation, together with discharge patterns, that is, patterns of the alternating component of the leakage current, corresponding to the various conditions of insulation. The leakage current characteristics A, B, C and D are curves of direct voltage in kilovolts versus the leakage current in the insulation in microamperes. The heavy lines in the characteristic curves indicate the relative voltage ranges at which detectable discharges will occur. The X-sign indicates the relative values of voltage at which the insulation will break down.

Referring now to characteristic A, which represents insulation when wet and dirty, i.e., the insulation contains an abundance of polar materials, it may be seen that continuous high frequency discharges occur at a relatively low value of applied voltage. Although the high frequency discharge commences long before breakdown, the anticipated breakdown voltage can be predicted from experience and skill in testing, i.e., the voltage may be increased until the discharge becomes very intense. Additionally, in most cases it may not be necessary to determine the anticipated breakdown voltage of wet and dirty insulation because the insulation will usually be treated in some way to remove polar materials before being returned to service.

Characteristic B is illustrative of dry and dirty insulation. Insulation in this condition exhibits occasional discharges, especially bursts of discharge at each incremental increase in voltage across terminals 4 and 5. The discharges cease to occur a short time after each change in voltage. When continuous discharges commence, the breakdown voltage is being approached; also the frequency of the discharge decreases with decrease in moisture content in the insulation.

Characteristic C indicates the results of tests on dry insulation of low dielectric strength. Continuous discharges lower in frequency than the cases of characteristic A or B, commence at relatively low voltages in comparison to insulation which is good but dirty. However, discharges start at a relatively high value of voltage in comparison to the voltage at which discharges commence in wet or wet and dirty insulation.

Characteristic D is illustrative of the leakage current through good dry insulation as the voltage across the insulation is increased. It is to be noted that the leakage current varies substantially linearly with applied voltage. Insulation in this condition exhibits discontinuous discharges, the discharges commencing close to the breakdown value of the insulation. With the start of discharges of any appreciable magnitude and frequency, the test must be stopped because the breakdown follows these discharges very closely.

The more moisture there is in the insulation, the lower is the voltage at which discharges will commence. Furthermore, the frequency of the discharge varies with the moisture content of the insulation. As may be noted in FIG. 2, the greater the moisture content of the insulation, the higher is the frequency of the discharge. Discharge frequencies may range from approximately 1,000 cycles per second to a few hundred kilocycles per second. However, it is not considered essential to cover this entire frequency range. Satisfactory results have been obtained where the frequency response of the test circuit was flat only in the region from one to approximately 50 kilocycles.

If it is desired to detect only the start of a certain discharge level, a suitable warning device could be used where I have illustrated the oscilloscope 15. Although I have illustrated the use of an oscilloscope 15 as a detector for detecting the nature of a discharge, it should be understood that other methods of detection may be available and be apparent to those skilled in the art. For example, inasmuch as the frequency of a discharge will vary with the moisture content of the insulation tested, the frequency spectrum of the discharge could be analyzed to determine the predominant frequencies of the discharge and a suitable indicating instrument could be calibrated to indicate the condition of the insulation. One method of doing this would be to use a series of narrow band filters and to scan the discharge, and apply the output of the scanning filters to a suitably calibrated indicating or recording instrument. In this manner, or in others which are or may become apparent, the frequency spectrum and the condition of the insulation would be correlated.

Detection of discharges during testing by itself yields information indicative of the condition of the insulation, as well as information indicative of the dielectric strength of the insulation. If desired, a leakage current characteristic may be plotted, together wtih a discharge test as I have disclosed. However, detection of the nature of the discharge together with measurement of the applied voltage, makes it unnecessary to measure the value of leakage current with increasing voltage for the purpose of detecting an impending breakdown.

It should now be apparent that I have provided a very simple and rapid non-destructive method of determining the condition and dielectric strength of insulation. This method substantially eliminates the possibility of surprise breakdowns of insulation, and is especially adaptable for field testing of insulation. Furthermore, no complex equipment is necessary, and positive information as to the condition of the insulation is readily determinable. Moreover, the disclosed test method is particularly adaptable for field testing of the insulation of electrical machines and apparatus.

While I have illustrated and described preferred steps of the method which comprises my invention, changes in the disclosed method may occur to those skilled in the art without departing from the spirit and scope of this invention. Accordingly, it is my intention to cover all changes and modifications of the examples of the invention herein disclosed which do not constitute departure from the spirit and scope of the invention.

What I claim as new and desire to secure by Letters Patent of the United States is:

1. The method of determining the presence of polar materials in and on electrical insulation which comprises the steps of:
   (a) applying a unidirectional voltage across the insulation;
   (b) incrementally increasing the magnitude of the voltage applied across said insulation until persistent or recurring electrical discharges associated with the insulation leakage current occur;
   (c) and detecting the pattern of the randomly varying alternating component of the leakage current.

2. The method of determining the condition and/or the presence of polar materials in and on electrical insulation which comprises the steps of:
   (a) applying a unidirectional voltage across the insulation;
   (b) incrementally increasing the manitude of the voltage applied across said insulation until persistent or recurring electrical discharges associated with the insulation leakage current occur;
   (c) measuring the magnitude of the voltage applied across said insulation;
   (d) and detecting the pattern of the randomly varying alternating component of the leakage current.

3. The method of determining the condition of electrical insulation which comprises:
   (a) applying a unidirectional voltage across the insulation;
   (b) increasing the magnitude of the voltage applied across said insulation in discrete steps;
   (c) measuring the magnitude of the voltage applied across said insulation;
   (d) deriving a voltage associated with the leakage current of said insulation;
   (e) and detecting the pattern of the randomly varying alternating component of said leakage current.

4. The method of determining the condition, dielectric strength and/or presence of polar materials in and on electrical insulation which comprises:
   (a) connecting the insulation across a source of controllable unidirectional voltage;
   (b) increasing the magnitude of the voltage applied across said insulation in increments;
   (c) measuring the magnitude of the voltage applied across said insulation;
   (d) deriving a voltage related to the leakage current of the insulation being tested;
   (e) and detecting the pattern of the randomly varying alternating componnet of the leakage current.

References Cited in the file of this patent
UNITED STATES PATENTS

| | | |
|---|---|---|
| 1,943,391 | Paine et al. | Jan. 16, 1934 |
| 2,558,091 | Johnson | June 26, 1951 |
| 2,837,714 | Hill | June 3, 1958 |
| 2,937,336 | Gooding | May 17, 1960 |